United States Patent [19]

Freissle

[11] Patent Number: 4,762,610
[45] Date of Patent: Aug. 9, 1988

[54] SCREENING ARRANGEMENT

[75] Inventor: Manfred F. A. Freissle, Johannesburg, South Africa

[73] Assignee: Screenex Wire Weaving Manufacturers (Proprietary) Limited, Alberton, South Africa

[21] Appl. No.: 914,679

[22] Filed: Sep. 30, 1986

[30] Foreign Application Priority Data

Oct. 21, 1985 [ZA] South Africa ............... 85/8083

[51] Int. Cl.$^4$ ............................................. B07B 1/46
[52] U.S. Cl. ...................................... 209/397; 209/408; 210/499
[58] Field of Search ............... 209/264, 267, 397, 408, 209/268, 380, 265, 266, 273; 210/498, 499

[56] References Cited

U.S. PATENT DOCUMENTS

| | | | |
|---|---|---|---|
| 1,939,314 | 12/1933 | Neifert | 209/397 |
| 2,321,675 | 6/1943 | Hauge | 209/408 |
| 2,335,084 | 11/1943 | Rice | 209/408 |
| 2,391,501 | 12/1945 | O'Brien | 209/397 |
| 2,576,794 | 11/1951 | Jost | 209/408 |
| 2,706,047 | 4/1955 | Dockins | 209/397 |
| 3,900,628 | 8/1975 | Stewart | 209/397 |
| 3,980,555 | 9/1976 | Freissle | 209/408 |
| 4,548,213 | 10/1985 | Phillips | 209/397 |

Primary Examiner—Sherman D. Basinger
Assistant Examiner—Clifford T. Bartz
Attorney, Agent, or Firm—St. Onge Steward Johnston & Reens

[57] ABSTRACT

There is provided a screening panel having screening apertures and which can be secured to a support frame side-by-side with similar panels to form a screen deck. The panel has ridges along two of its sides which project above the screening surface. The ridges form a channel which confines liquid flowing across the screen deck to flow across the screening apertures. Grooves extend through the ridges to direct liquid flowing across the screen deck directly into the screening apertures.

1 Claim, 5 Drawing Sheets

SCREENING ARRANGEMENT

BACKGROUND OF THE INVENTION

This invention relates to a screening arrangement. The invention relates in particular to a screening panel and to a screen deck including such panels. More particularly the invention relates to screening panels and screen decks for screening ores which are to be washed.

In screening ores which are to be washed it is often a problem that the ore cannot be washed effectively when the ore bed is thin and there is a low liquid flow.

It is another object of the invention to overcome or to minimize the above disadvantage.

According to the invention there is provided a screening panel having screening apertures and which is adapted to be secured to a support frame in a side-by-side abutting relationship with similar panels, in which the panel has a periphery which includes at least two sides which are substantially parallel to each other, and ridges on the substantially parallel sides projecting above the screening surface of the panel so that the ridges are spaced from each other along the two substantially parallel sides along the periphery of the panel.

The ridges may have any convenient cross-sectional configuration such as angular, for example triangular, or rectangular, or curved, for example rounded.

The ridges on the panel may be so arranged that when two such panels are fitted on a support frame in a side-by-side abutting relationship, the ridges on adjacent panels abut each other to thereby form a larger ridge of double the cross-sectional configuration than that of a single ridge.

Grooves may be provided in the ridges leading directly into screening apertures in the panel. The grooves may be positioned at an angle to the longitudinal axis of the panel so that when liquid flowing across the panel and across the ridges strike against the sides of the grooves, the liquid is deflected directly into the screening apertures.

The screening panel may have fixing protrusions spaced from each other along the peripheral region of the panel. The arrangement may be such that the protrusions on adjacent panels fit in pairs in apertures extending through a supporting frame.

The screening panel may be moulded in a suitable synthetic plastics material such as polyurethane.

The invention further extends to a screen deck comprising a plurality of screen panels in accordance with the invention secured to a support frame.

The invention is now described with reference to the accompanying drawings, in which FIG. 1 shows a plan view of a screening panel in accordance with the invention;

Figure 1:
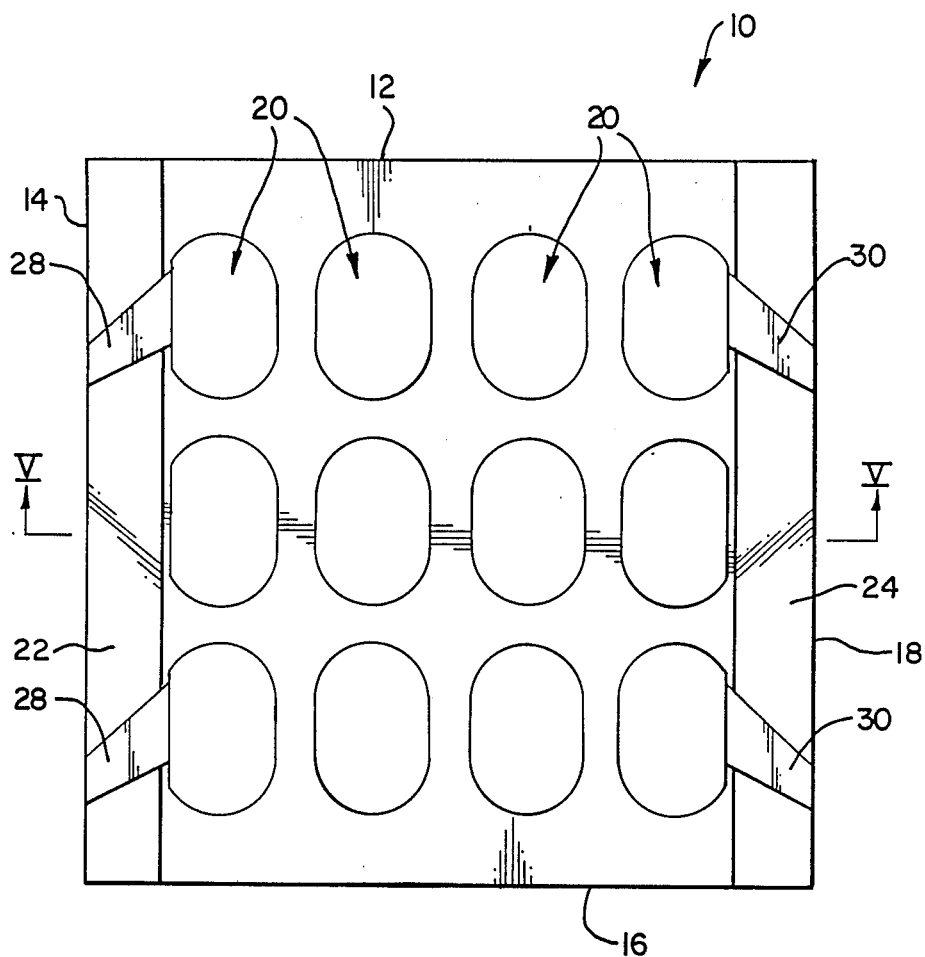
Figure 2:
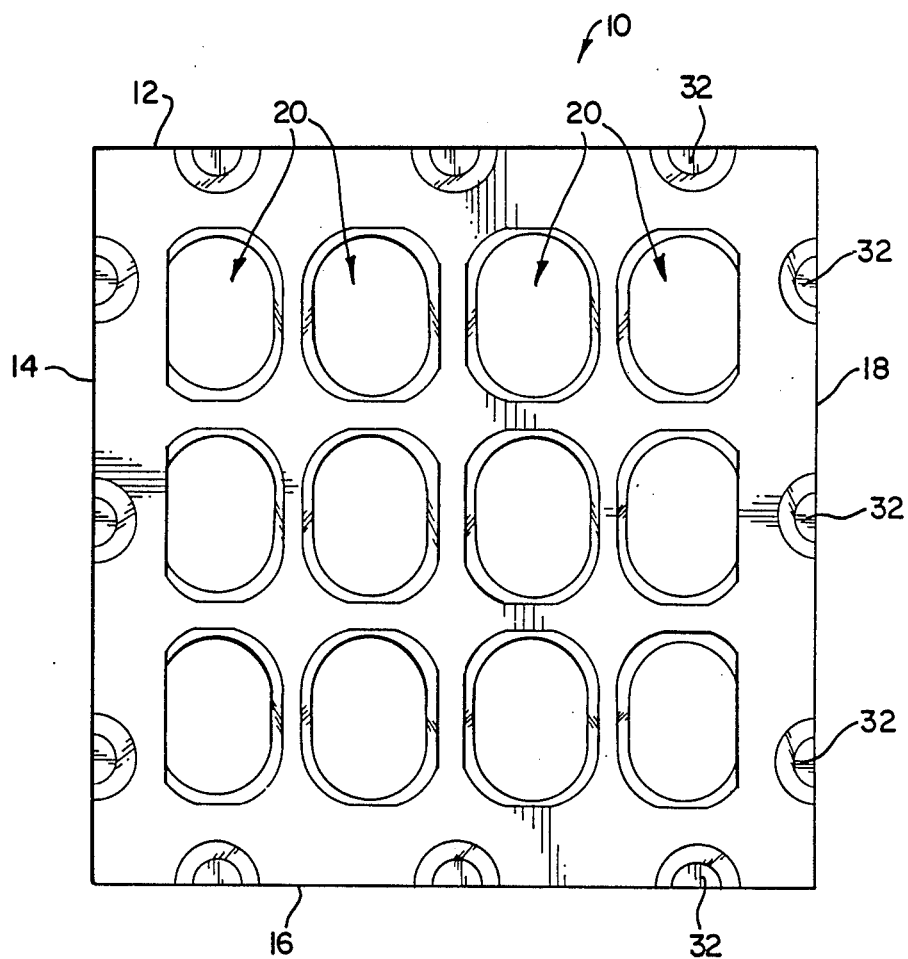
FIG. 2 shows a bottom plan view of the screening panel shown in FIG. 1.
Figure 3:
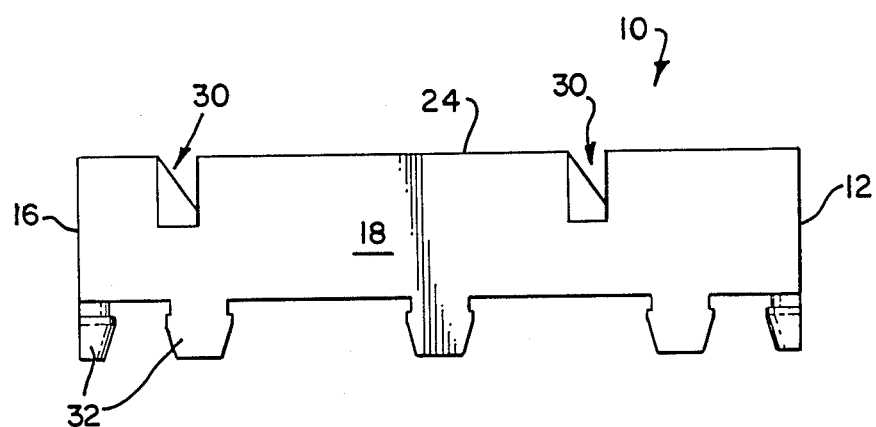
FIG. 3 shows a side view of the screening panel shown in FIG. 1.

Referring to FIGS. 1 to 5, reference numeral 10 indicates the screening panel in general. It is of a synthetic plastics material such as polyurethane and is rectangular in shape having four parallel sides 12,14,16 and 18. The sides 12 and 16 are parallel to each other and the sides 14 and 18 are parallel to each other. The panel has downwardly diverging screening apertures 20 extending through the panel.

Along the sides 14 and 18 of the panel, and at the peripheral regions of the panels along these sides, there are provided ridges 22 and 24 projecting upwardly above the screening surface 26 of the panel. The ridges 22 and 24 shown in the drawings are of a triangular configuration, but they may be of any other suitable angular shape such as rectangular shape, or may be of a suitable curved cross-sectional configuration e.g. rounded shape.

Grooves 28 and 30 extend angularly through the ridges 22 and 24 respectively directly into the screening apertures 20.

The screening panel 10 has spigot-like protrusions 32 spaced from each other along the peripheral region of the panel. These protrusions fit in pairs with the protrusions on similar panels through fixing apertures in a support frame (shown in FIG. 7) when such panels are arranged side-by-side on the support frame.

Figure 4:
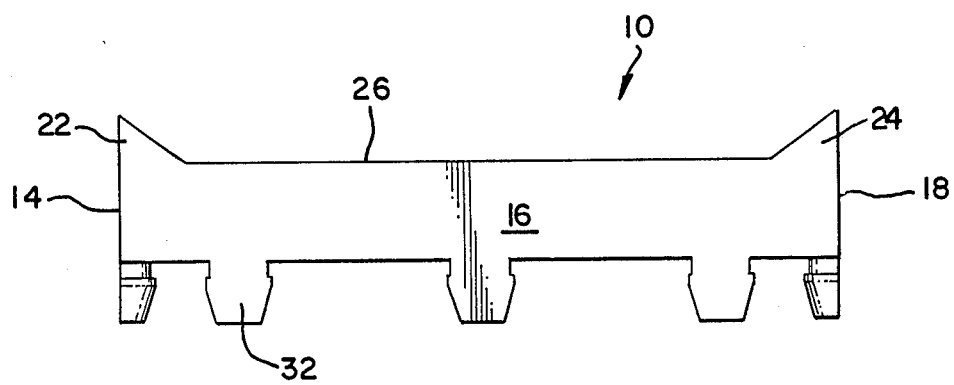
FIG. 4 shows an end view of the screening panel shown in FIG. 1.
Figure 5:
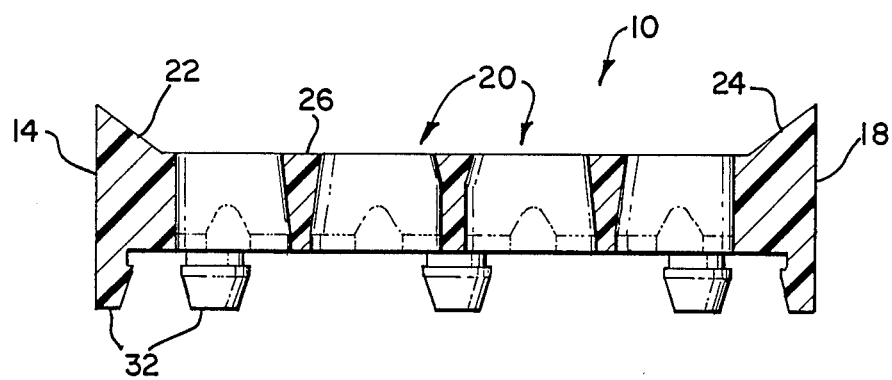
FIG. 5 shows a section on line V—V of FIG. 1.

Referring to FIG. 4, it will be noted that the upwardly projecting ridges 22 and 24 together with the screening surface 26 form a trough in which liquid and ore to be washed (not shown) can flow during a screening operation. When the ore bed is thin and the liquid flow small, the ridges 22 and 24 assist in confining the liquid flow to the screening surface 26 and thereby assist in directing the liquid flow directly into the screening apertures 20 shown in FIG. 1. Thereby more efficient ore washing can be effected when the ore bed is thin.

Figure 6:
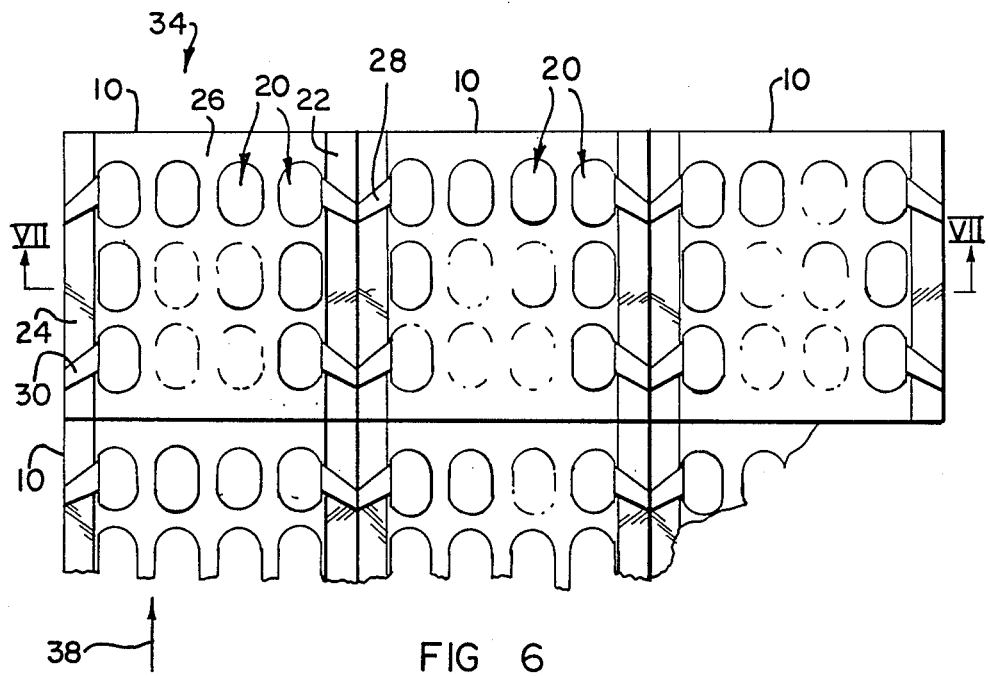
FIG. 6 shows a fragmentary plan view of a screen deck comprising a plurality of screening panels of FIG. 1 arranged side-by-side on a support frame.
Figure 7:
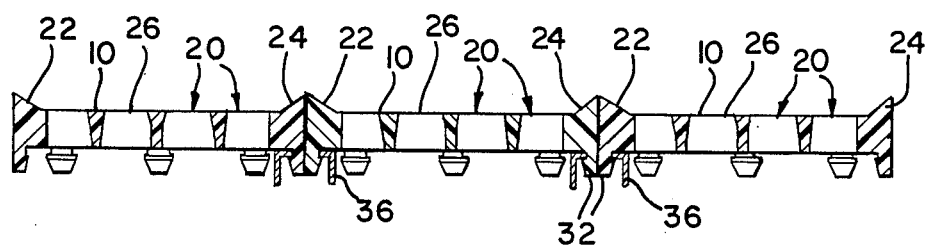
FIG. 7 shows a section line VII—VII of FIG. 6.

Referring now to FIGS. 6 and 7 of the drawings, there is shown a screen deck 34 comprising a plurality of screening panels 10 arranged side-by-side in an abutting relationship on a support frame 36. The support frame 36 has spaced apertures through which the protrusions 32 on the panels can be fitted in pairs to thereby secure the panels to the support frame. It will be noted from FIG. 7 that with the panels thus arranged side-by-side, the abutting ridges 22 and 24 form larger ridges in combination which project from the screening surfaces 26 of the panels.

In use, when the washing liquid and ore to be washed flow over the screen deck 34 in the direction of the arrow 38, the liquid and ore mixture are confined to the screening surface 26 between the ridges 22 and 24. This facilitates liquid flow and washing of the ore, especially when the ore bed is thin and the liquid flow is thin. The grooves 28 and 30 extending through the ridges 22 and 24 further assist in deflecting liquid flow directly into the screening apertures 20.

I claim:

1. A screening panel molded of a suitable synthetic plastics material and having screening apertures and which is adapted to be secured to a support frame in a side-by-side abutting relationship with similar panels, in which the panel has a periphery which includes at least two sides which are substantially parallel to each other, and ridges of an angular cross-sectional configuration on the substantially parallel sides projecting above the screening surface of the panel so that the ridges are spaced from each other along the two substantially parallel sides along the periphery of the panel, and which panel includes grooves in the ridges leading directly into screening apertures in the panel, the grooves being positioned at an angle to the longitudinal axis of the panel so that when liquid flowing across the panel and across the ridges strikes against the sides of the grooves, the liquid is deflected directly into the screening apertures, and wherein the ridges on the panel are so arranged that, when two such panels are fitted on a support frame in a side-by-side abutting relationship, the ridges on adjacent panels abut each other to thereby form a larger ridge of double the cross-sectional configuration than that of a single ridge.

* * * * *